(12) United States Patent
Palmquist

(10) Patent No.: US 6,623,054 B1
(45) Date of Patent: Sep. 23, 2003

(54) COLLISION SAFETY DEVICE FOR VEHICLES

(76) Inventor: Evert Palmquist, Lönnvägen 8, S-691 Karlskoga (SE)

( * ) Notice: Subject to any disclaimer, the term of this patent is extended or adjusted under 35 U.S.C. 154(b) by 0 days.

(21) Appl. No.: 10/030,130

(22) PCT Filed: Aug. 2, 2000

(86) PCT No.: PCT/SE00/01533
§ 371 (c)(1),
(2), (4) Date: Feb. 15, 2002

(87) PCT Pub. No.: WO01/10683
PCT Pub. Date: Feb. 15, 2001

(30) Foreign Application Priority Data

Aug. 5, 1999 (SE) ................................ 9902839

(51) Int. Cl.$^7$ ............................................. B60R 19/40
(52) U.S. Cl. .......................... 293/48; 293/4; 180/169; 180/274; 180/275
(58) Field of Search ................... 293/48, 4, 118, 293/119; 180/274, 275, 169

(56) References Cited

U.S. PATENT DOCUMENTS

| | | | | |
|---|---|---|---|---|
| 1,713,403 A | * | 5/1929 | Sniatowski | 293/48 |
| 2,312,036 A | * | 2/1943 | Hextell | 293/119 |
| 4,116,482 A | * | 9/1978 | Spiegel | 293/119 X |
| 5,033,569 A | * | 7/1991 | Hayes | 293/118 X |
| 5,042,858 A | * | 8/1991 | Schubert et al. | 293/118 X |
| 5,101,927 A | * | 4/1992 | Murtuza | 293/118 X |
| 5,810,427 A | * | 9/1998 | Hartmann | 293/118 X |

FOREIGN PATENT DOCUMENTS

| | | | | |
|---|---|---|---|---|
| DE | 1239581 | * | 4/1967 | 293/119 |
| EP | 0589227 | * | 3/1994 | |
| JP | 3739342 | * | 6/1989 | 293/119 |
| JP | 133262 | * | 5/1990 | 293/118 |

* cited by examiner

*Primary Examiner*—Dennis H. Pedder
(74) *Attorney, Agent, or Firm*—Dennison, Schultz & Dougherty

(57) ABSTRACT

Device for motor vehicles designed to prevent traffic accidents or to reduce their injurious consequences. The extent of injuries in traffic accidents can be reduced significantly by employing the vehicle bumper (1) as a crumple (deformation) zone. A sensor (2) is used to record this distance from and speed relative to an obstacle in the direction of travel. When a collision is unavoidable, one end of the bumper (1) is projected outward by a propellant charge (13) so that, together with a strut (17, 22, 24), if forms a crumple zone ahead of the vehicle. The device can also be provided with a system to warn of dangerous traffic situations, and to brake the vehicle automatically or reduce its speed if the risk of a collision exists. In the case of trucks and buses, the bumper (1) may be deployed by means of a pneumatic cylinder (4) and valve (7), which are controlled by the vehicle's ordinary speedometer. The bumper remains depolyed above a certain threshold speed.

7 Claims, 8 Drawing Sheets

COLLISION SAFETY DEVICE FOR VEHICLES

The present invention relates to a device to prevent or reduce the effects of traffic collisions of various types.

BACKGROUND OF INVENTION

In Sweden alone, 500 to 600 people are killed and about 4,000 injured in traffic accidents every year. Worldwide, the number of annual fatalities is almost one million. In no other activity does society tolerate such an enormous rate of death and injury. Compared with air travel, the risk of being injured in a road traffic accident is 500 times higher.

The total cost to the community of traffic accidents in Sweden alone exceeds SEK20 billion per year.

The desire and necessity of reducing the number of traffic accidents and their effects is particularly high all over the world. Road networks are being expanded and improved continuously to achieve this goal. Vehicles have also been improved in various ways, for example by the provision of seat belts, driver and passenger airbags, side airbags and seat belt pretensioners. The design of the front end of a vehicle is now such that a crumple (deformation) zone is provided to absorb the kinetic energy of the collision with an oncoming vehicle or other traffic obstacle, thereby lessening the stresses on the driver and passengers.

Patents for several types of extendable bumper designed to reduce retardation in a collision have been sought in recent years. However, none of these inventions has been adopted in practice, probably because they are complex, heavy and expensive, and because they rely on hydraulic operation, which does not provide the requisite speed of deployment.

PURPOSE AND MOST IMPORTANT CHARACTERISTICS OF INVENTION

The purposes of the present invention are, firstly, to provide a crumple zone which is sufficiently long to prevent or reduce vehicle damage and injury to the vehicle and its occupants in frontal collisions of various types and, secondly, to provide a deflecting action such that the vehicles are displaced laterally in a collision in which only a small part of the vehicle fronts collide, or in a collision with a tree, post or similar obstacle at the side of the road.

The invention is also designed to reduce the risk of injury and damage in lateral and rear-end collisions. The invention also has a beneficial effect in collisions with pedestrians, cyclists and wild animals.

The invention can also make the driver aware of a traffic obstacle in sufficient time to brake or take evasive action (cf. the collision warning indicator in an aircraft). It can also be used to operate the vehicle brakes if a collision is unavoidable (this feature should be used only on vehicles with anti-lock brakes), to warn the driver if his vehicle is too close to the vehicle in front and to deliver a warning if driving without seat belts above a certain speed.

The invention can be used on vehicles of all types, including trucks, buses, minibuses and cars. It can also be used in both left and right-hand drive traffic, although mirror-image versions must be made to suit each application. The collision protection can also be made convertible so that adjustment of the function from left to right-hand drive traffic, and vice versa, can be performed manually.

It is particularly important to equip heavy vehicles with this invention in view of the fact that a collision between a car and a heavy vehicle is almost invariably disastrous for the smaller vehicle. As a result, the collision protection should always designed for collision with a car. To ensure that the invention affords maximum protection, international agreement is needed to standardise the height of the bumper above the road on all types of vehicle.

PRINCIPLE OF OPERATION

Extension of the crumple zone is achieved by mounting one end of the bumper, which is designed for the purpose, in a pivoted manner on the left front end of the vehicle for right-hand traffic (or on the right front end for left-hand traffic) by means of a vertical pin, the other end of the bumper being secured by a disengagable latch. If a collision is imminent, the right-hand side of the bumper (or the left-hand side as appropriate) will be projected forward so that the bumper, together with a strut which locks it in the extended position, will assume the shape of a snow plough. The strut may take different forms.

Deployment is initiated by means of an instrument consisting of a sensor and a computing device mounted on the bumper or, alternatively, inside the vehicle windscreen to keep the sensor optics clean. The purpose of the sensor, which may be of the laser, radar or infrared (IR) type, is to detect and register obstacles in the direction of travel, and to record the vehicle's speed relative to and distance from the obstacle. The sensor may be linked to the steering system so that it also follows the vehicle's direction of travel when cornering.

When an obstacle appears at a distance approaching the vehicle's stopping distance, the computing device shall provide the driver with a warning signal which may be either optical and/or acoustic. The optical signal can be projected onto the windscreen in the lower part of the driver's field of vision, allowing him or her to brake the vehicle or take evasive action. The warning system is particularly valuable in darkness and fog, and is designed especially for drivers with impaired reactions, such as those affected by alcohol, drugs or medicines, drivers who have fallen asleep, and older drivers with impaired vision and hearing. Drivers who take excessive risks in traffic due to inattention or poor driving behaviour will also receive a warning from the system.

Integrating a signal from the seat belts in the warning system will provide a warning signal for that function also. The warning system may, in future, also be interlinked with speed information supplied to the driver. However, this assumes that speed limit signs will be equipped with electronic transmitters which send the information to the driver by wireless transmission.

If the driver neglects to reduce speed in spite of the warning signals, the system may take over the driver's role and reduce the speed of the vehicle until the warning signal ceases.

The computing device receives a signal from the vehicle's own speedometer to enable it to compute the stopping distance. Since the stopping distance is dependent, firstly, on the driver's reaction time and, secondly, on the road surface conditions, provision should be made for entering different surface conditions manually. The driver's reaction time may be a single, constant value or may be a separate value for each driver.

If the vehicle continues towards an unavoidable collision despite the warning system, the sensor will initiate deployment of the bumper. This will take place only a short distance before the collision actually occurs and when the speed of the vehicle relative to the obstacle exceeds a certain threshold value. As a result, deployment must take place within a very short time. This is achieved by means of a propellant charge, which is ignited by an electrical igniter connected to the sensor through the computing device. The charge, which may be of the same type as the seat ejector cartridge used in combat aircraft, or may consist of some type of combustible gas, propels the free end of the bumper forward with high force after the latch has been disengaged.

The bumper, and the strut which locks it in the deployed position, then form the desired crumple zone, while also acting as a deflector in a collision with an obstacle which impacts only a small section of the vehicle front.

In a total frontal collision at high speed, the bumper and strut will be deformed, absorbing the kinetic energy of the vehicles so that the retardation is limited to an acceptable value.

To improve protection for cyclists, pedestrians and wild animals, all or part of the vehicle front, particularly the radiator grille, may be mounted on the bumper and carried with it.

Protection for the aforementioned road user categories may be further improved by deploying a special type of air cushion along the entire length of the bumper. This is designed, when inflated, to form a curtain in the form of an air mattress in front of the bumper-mounted grille. In this case also, inflation is initiated by the computing device so that it takes place at an instant related to the collision speed.

On vehicles with anti-lock brakes, the signal from the computing device may also be used to apply the brakes immediately before the instant of impact. Since this eliminates the driver's reaction time, the brakes are applied for longer and the collision speed is reduced.

A simpler variant of the collision protection may be used on trucks and buses. In this case, the protection may be deployed with the aid of a double-acting pneumatic cylinder instead of a propellant charge. The protection will remain deployed while the vehicle is travelling at a speed in excess of the preset threshold value. The device does not interfere with the handling of the vehicle.

The protection is retracted and no longer adds to the length of the vehicle when the speed falls below the threshold value.

A valve controlled by electrical signals from the vehicle's speedometer is used to control the compressed air supply from the vehicle's ordinary compressed air system, to ensure that the protection is deployed at the correct speed. Since the optronic sensor and propellant charge are not required, this version of the system is considerably simpler, cheaper and more reliable.

LIST OF DRAWINGS

LIST OF COMPONENTS

Figure 1:
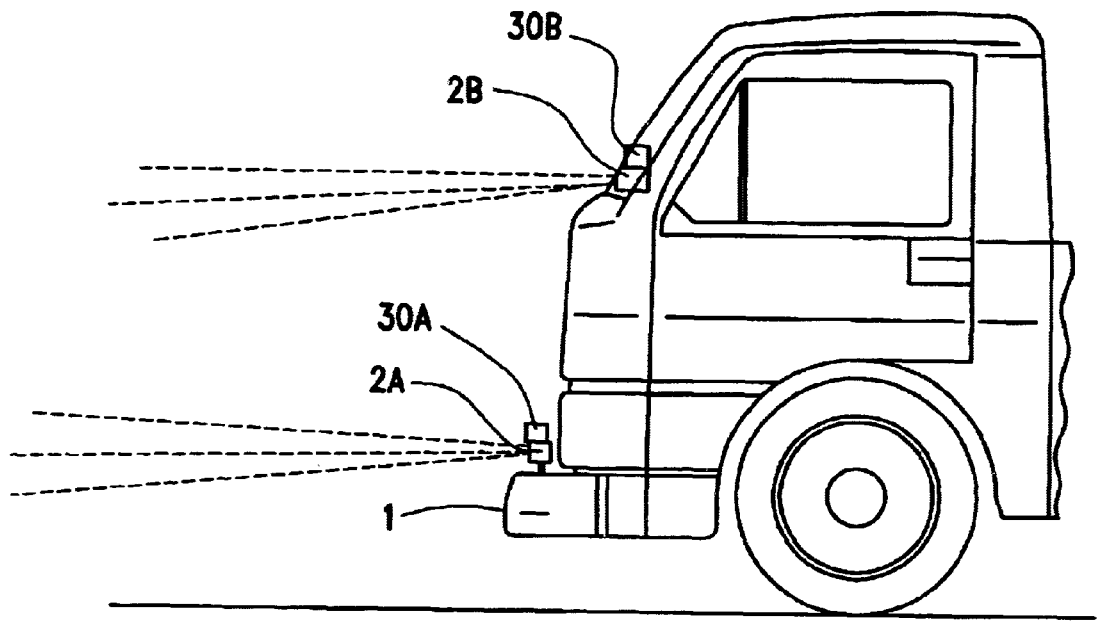
FIG. 1 is side view of a truck with the collision protection in the retracted position.
Figure 2:
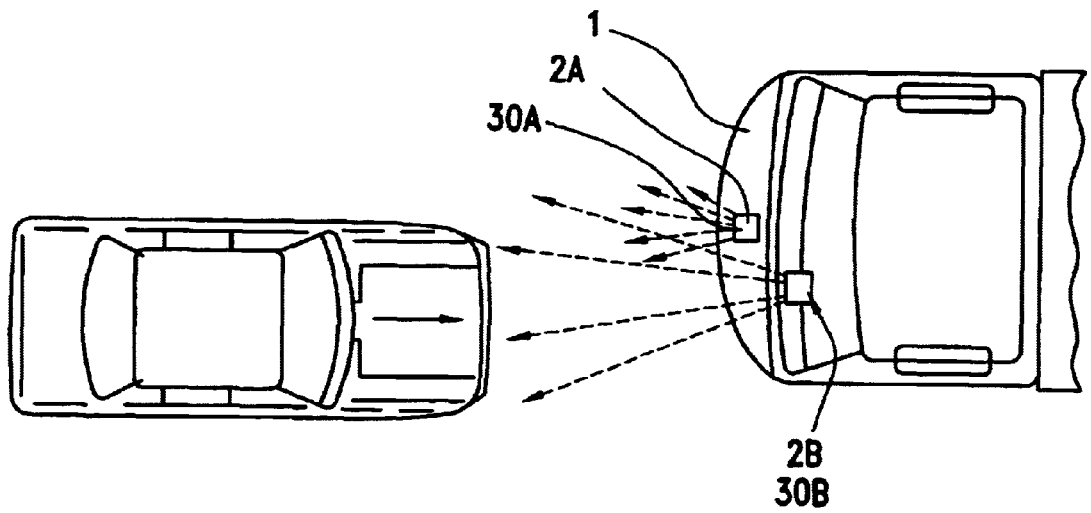
FIG. 2 is a plan view of a car and a truck immediately prior to collision.

1. Bumper and collision protection
2A. Sensor, with computing device (30) mounted on bumper
2B. Sensor mounted inside windscreen
3. Vertical pin
4. Compressed air cylinder
5. Piston rod
6. King pin
7. Compressed air valve
8. Roller
9. Vehicle chassis
10. Latch
11. Pin
12. Spring
13. Propellant charge
14. Electrical igniter
15. Cable between electrical igniter and computing device
16. Sleeve
17. Strut
18. Vertical bolt
19. Longitudinal channel in bumper
20. Latch
21. Spring
22. Strut, rear section
23. Viscous medium
24. Strut, front section
25. Fixed restrictor
26. Sealing diaphragm
27. Radiator grille mounted on bumper
28. Air cushion
29. Channel for non-deployed air cushion
30. Computing device, integrated with sensor (2)

TYPICAL EMBODIMENT

FIG. 1 shows the front section of a truck equipped with collision protection (1) and a sensor (2), with a computing device (30) to record relative speeds and distances in the direction of travel.

The sensor is manufactured in accordance with known technology and is adapted for this particular application. When the distance between the vehicle and an obstacle exceeds a certain threshold value, the sensor triggers the propellant charge (13) by means of an electrical igniter (14) connected to the computing device (30) by the cable (15).

This causes one end of the bumper (1) to be projected forward about the vertical pin (3), which is supported by a bearing in the vehicle chassis (9). The right-hand end of the strut (17) pivots about a second vertical pin (3'), which is supported by a bearing in the vehicle chassis (9). At the left-hand end, the strut (17) is attached to the bumper (1) by the vertical bolt (18), which may be provided with a roller (8).

The latch (10) for the bumper (1) is released at the same instant that the propellant charge (13) is ignited, the sleeve (16), which partially encloses the charge, being pushed backward to disengage the latch (10).

Figure 3:
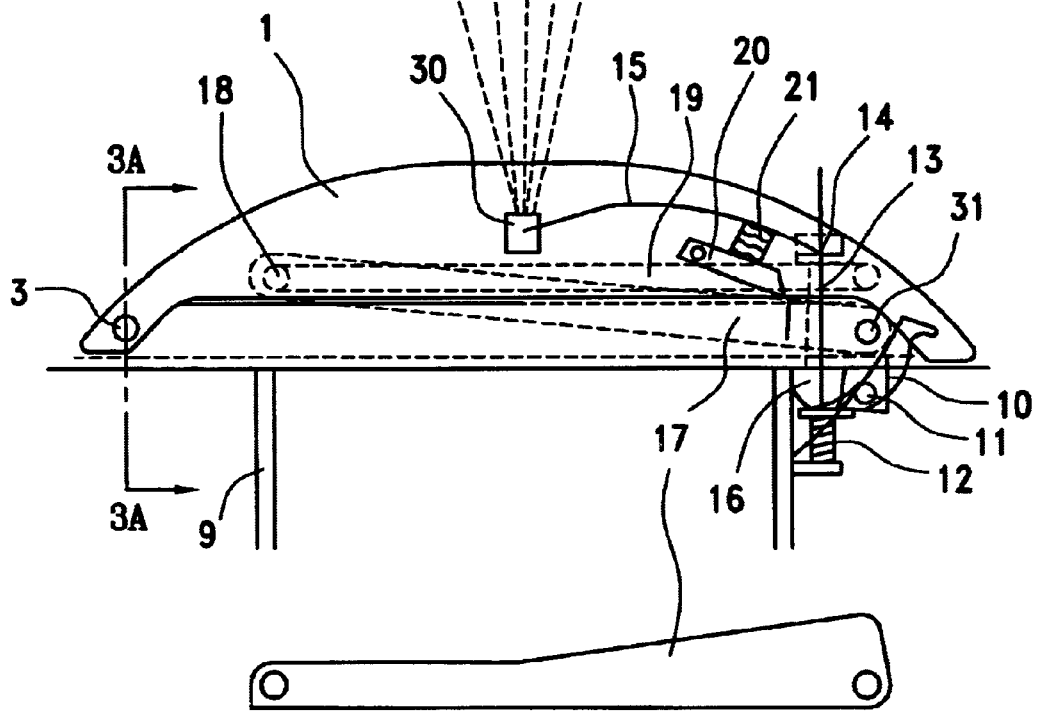
FIG. 3 is a plan view of the collision protection in the retracted position.
Figure 3A:
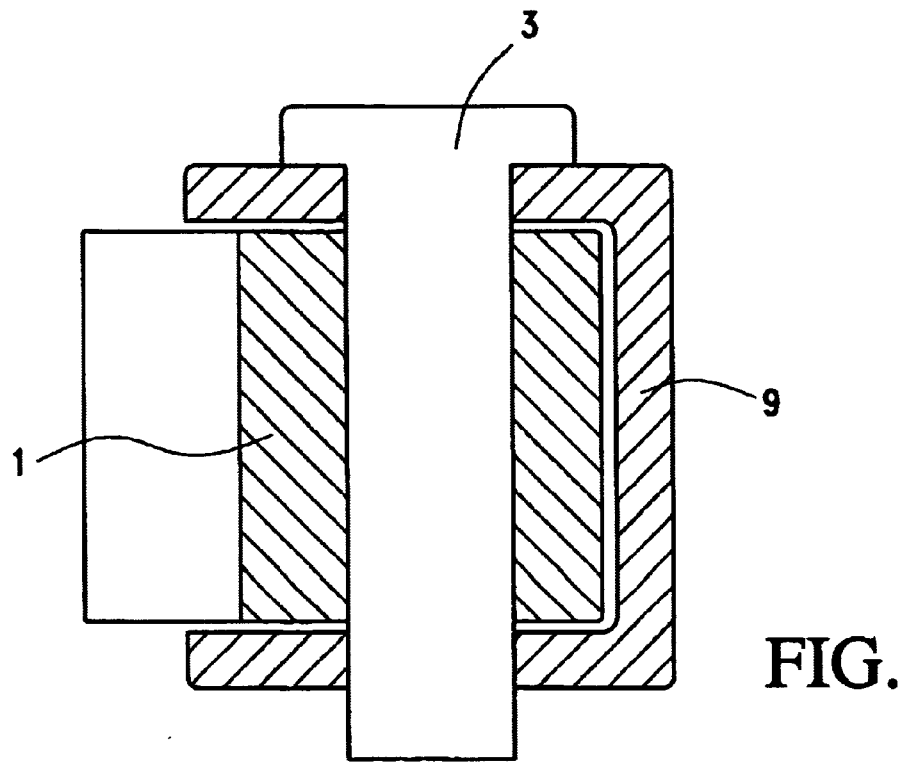
FIG. 3A is a cross-sectional view of the collision protection in the retracted position shown in FIG. 3.
Figure 4:
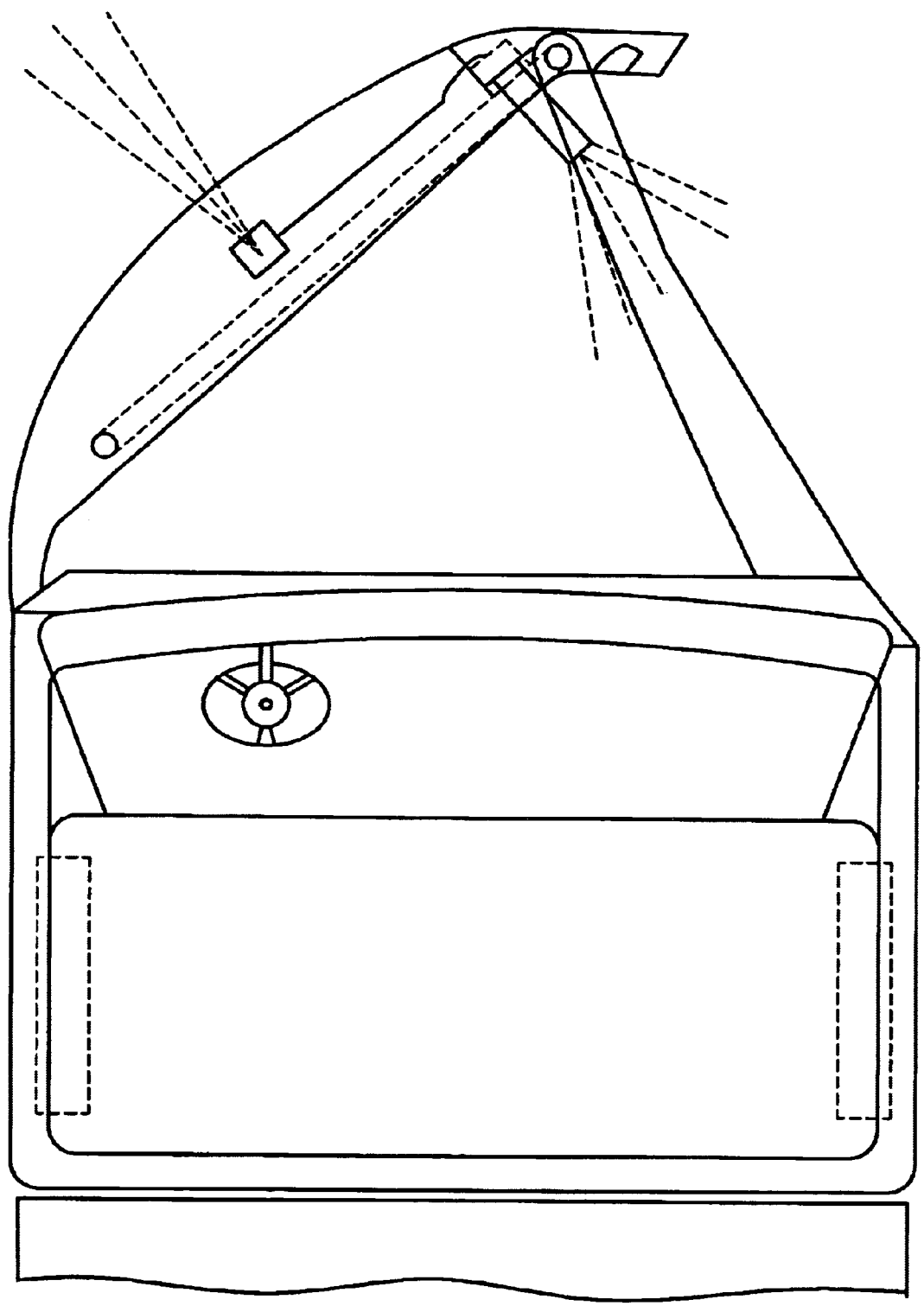
FIG. 4 is a plan view of the collision protection in the deployed position.

FIG. 3 shows the strut (17) and bumper in the retracted position. FIG. 4 shows the collision protection in the deployed position, mounted on a vehicle chassis.

When the right-hand side of the bumper (1) is projected forward, the left-hand end of the strut (17), carrying the bolt (18), slides along a channel (19) in the bumper (1) until its movement is terminated by the channel length. The strut (17) is locked in this position by the latch (20) and spring (21).

Figure 5:
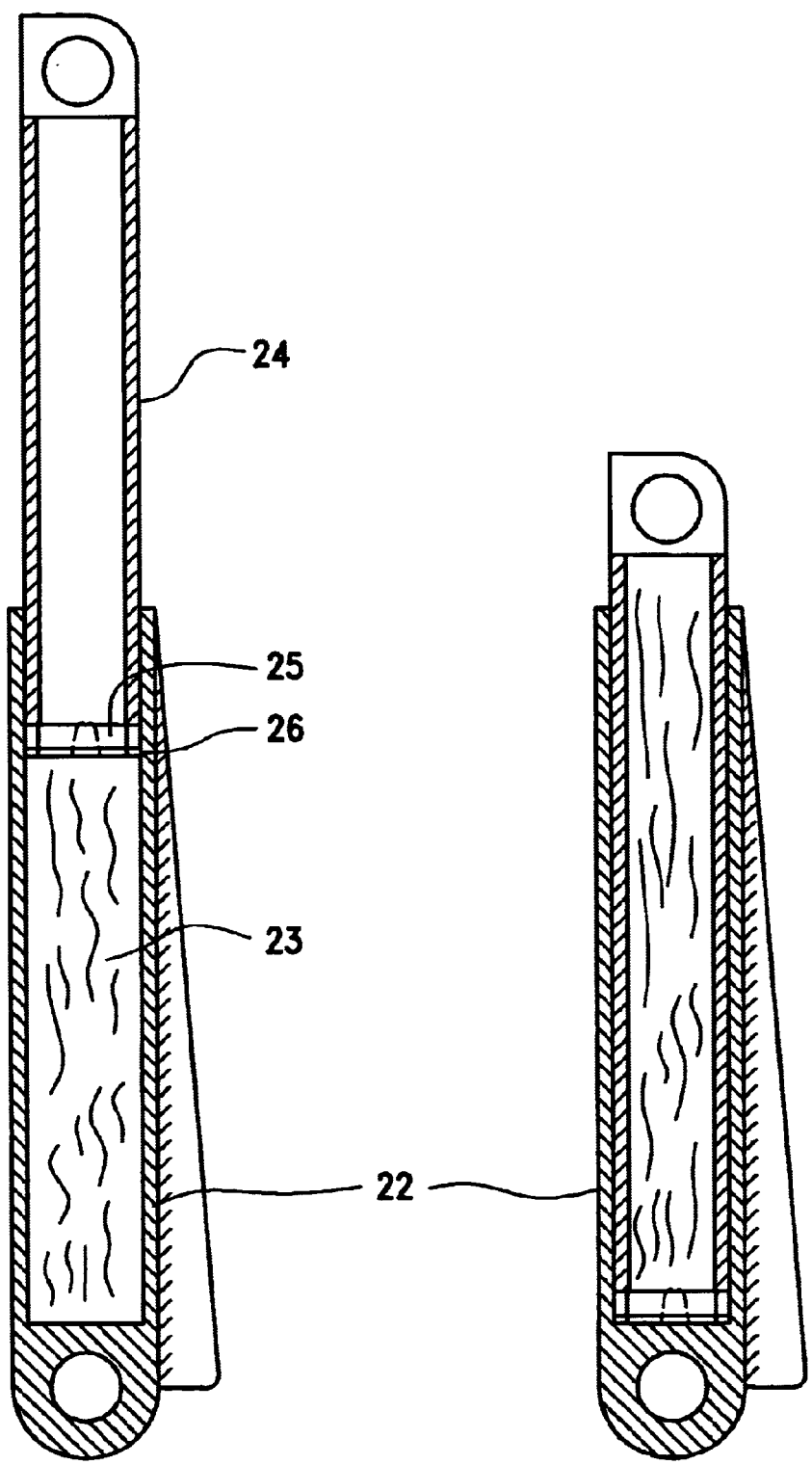
FIG. 5 shows an alternative design of strut.

FIG. 5 shows an alternative design of strut (17) with hydraulic energy absorption. In this version, the strut consists of two telescopic sections. The hollow space in the rear section (22) is filled with a viscous medium (23). The front section is provided with a fixed restrictor (25) and sealing diaphragm (26), the purpose of which is to prevent the liquid medium (23) from flowing into the front section (24).

This version of the strut is deployed in the same manner as in the alternative described previously. However, at the instant of collision, when a severe load is imposed on the bumper (1), the two sections are forced together, subjecting the viscous medium (23) to an extremely high pressure and bursting the sealing diaphragm (26), so that the medium (23) in the rear section flows through the restrictor into the front section (24). This produces a controlled braking action, which also varies automatically depending on the collision speed. The higher the speed, the greater the resistance offered by the strut, which is precisely the effect sought. At low collision speeds, this enables the strut to absorb the entire kinetic energy of the vehicles without deformation.

The strut sections (22 and 24) may be square, rectangular or circular in section, and may be duplicated to increase the resistance. In this case, only the rear sections (22) are rigidly attached to each other, the front sections (24) being connected through the bolt (18).

In both alternatives, the bumper and strut are designed in such manner that they can absorb, while undergoing deformation, the kinetic energy of a light vehicle (a medium-class car) in a collision at a speed which is average for collisions of different types.

Figure 6:
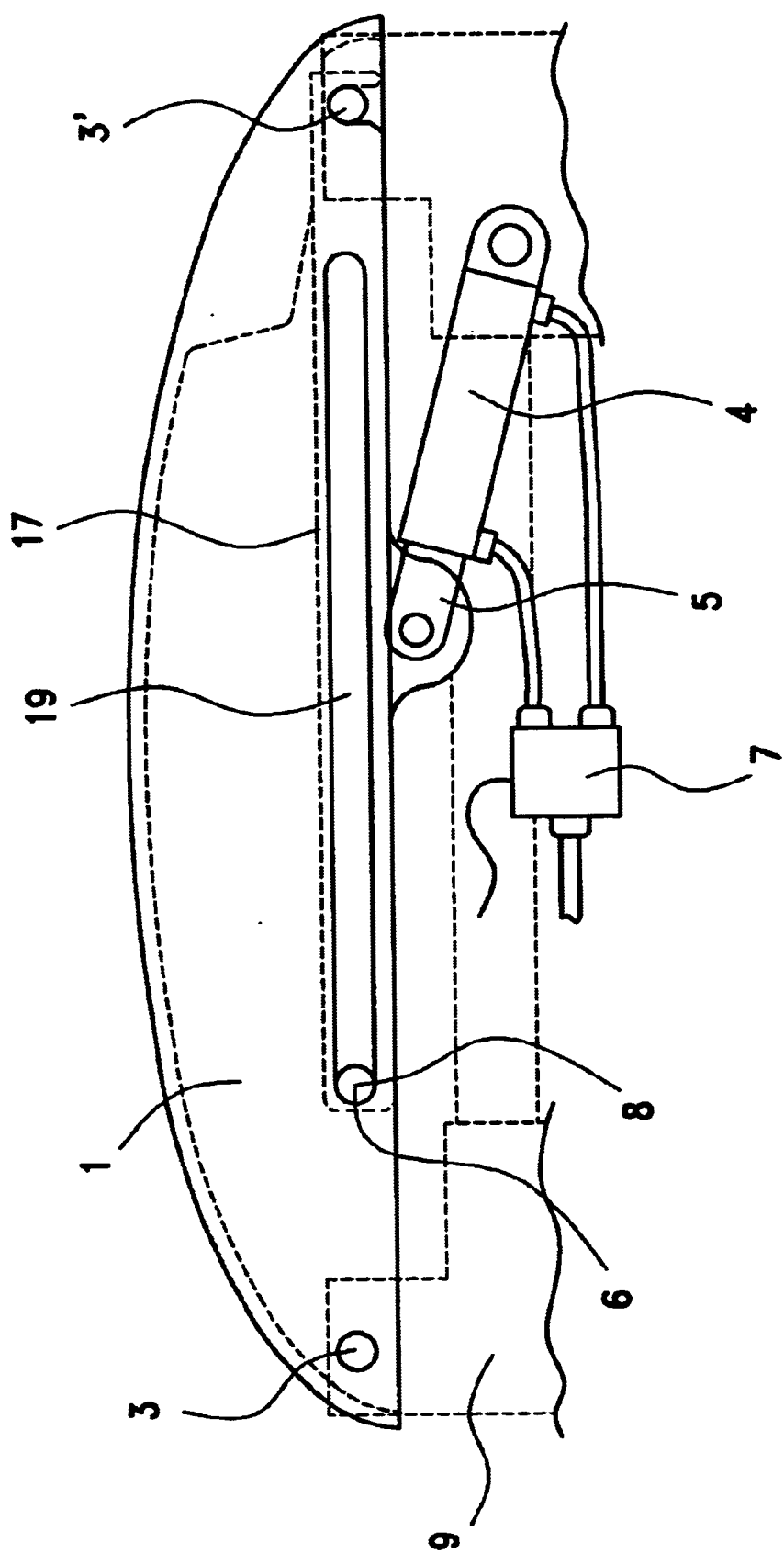
FIG. 6 shows the pneumatically operated version of the collision protection in the retracted position.
Figure 7:
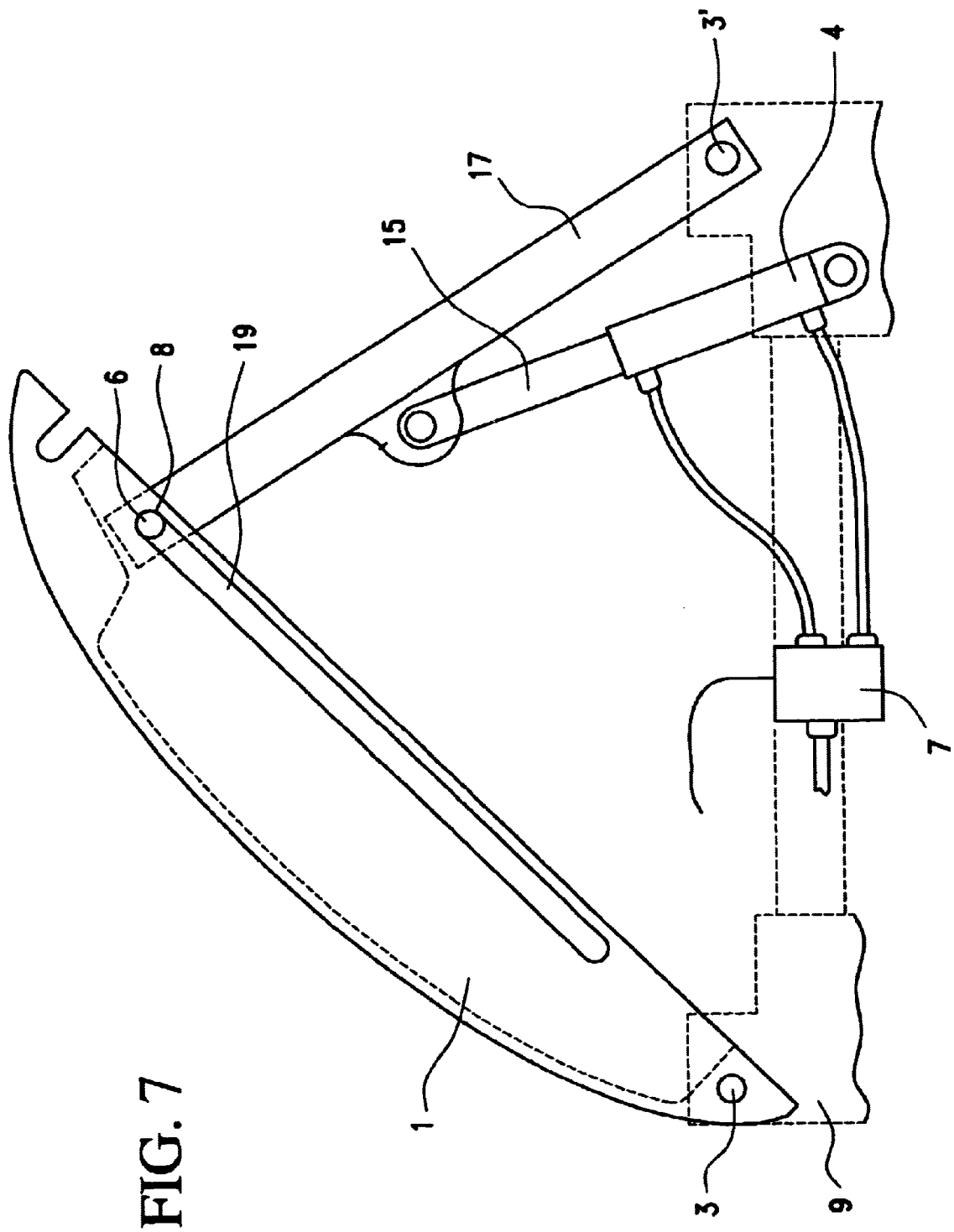
FIG. 7 show the pneumatically operated version of the collision protection in the deployed position.

FIGS. 6 and 7 show a simpler variant of the collision protection, which is suitable for use on trucks and buses.

In this case, the bumper (1) is deployed by a double-acting compressed air cylinder (4), whose piston rod (5) actuates the strut (17) and, as a result, the bumper (1). The air supply to the cylinder (4) is controlled by a valve (7) which, in turn, is controlled by an electrical signal from the vehicle speedometer. The compressed air is taken from the vehicle's ordinary compressed air system.

Deployment occurs at a specific, preset, threshold speed. When the speed falls below this value, the piston rod (5) is pulled inward and the bumper (1) is returned to the retracted position, in which it does not add to the vehicle length.

Figure 8:
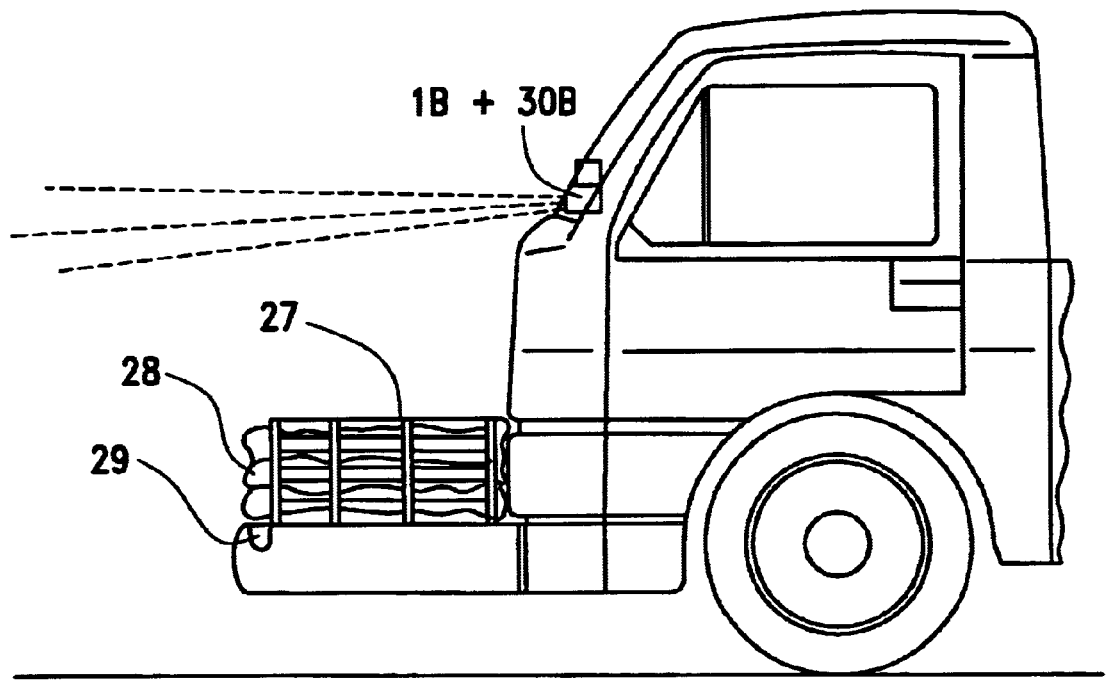
FIG. 8 is a side view of a truck with the collision protection deployed.

FIG. 8, which is a side view of the collision protection (bumper) in the deployed position on a truck, also shows the radiator grille (27) mounted on the bumper, as well an inflated air cushion in front of the grille. In the non-deployed position, the air cushion is seated in a channel (29) in the bumper (1).

Figure 9:
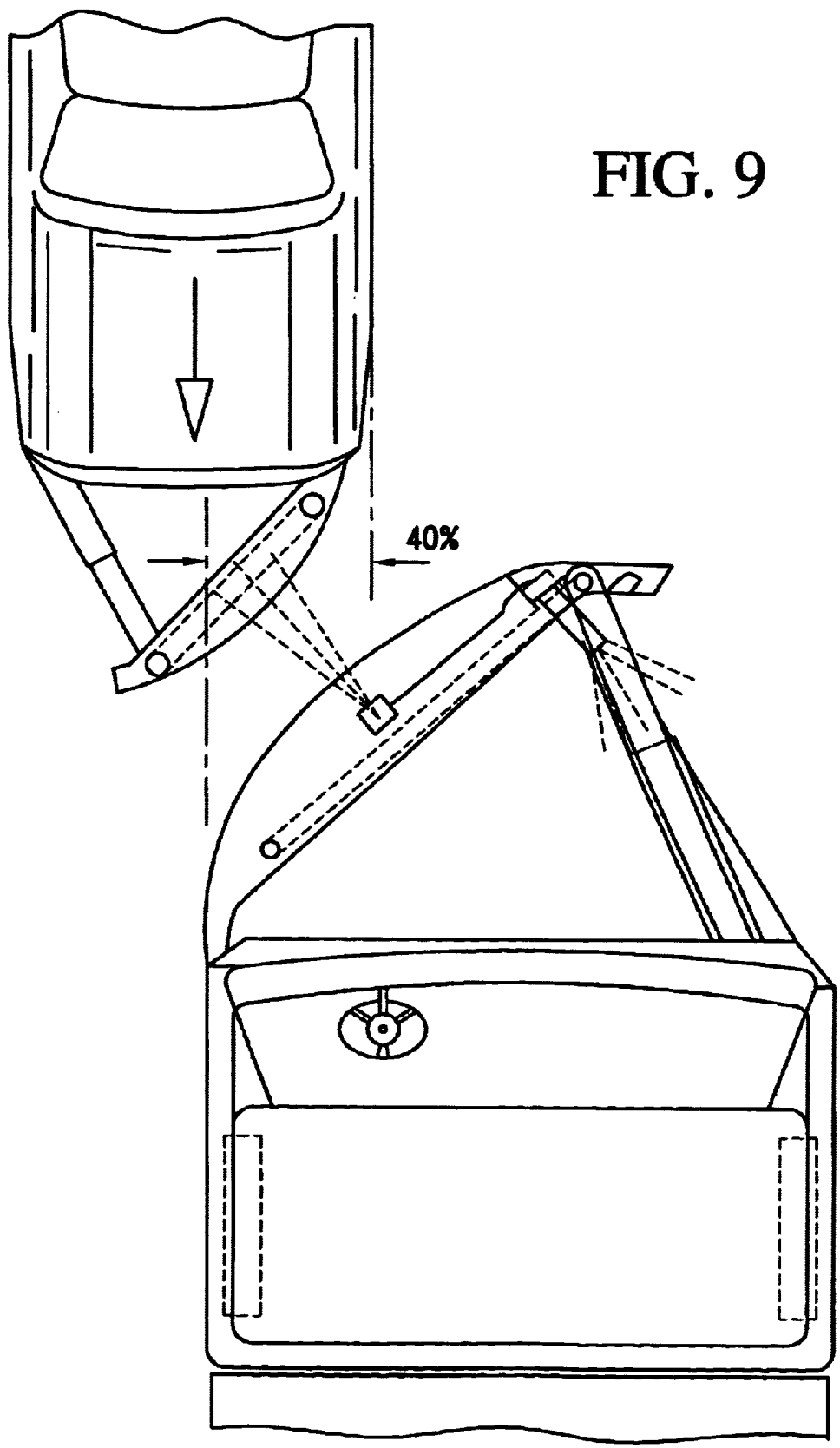
FIG. 9 is a plan view of a car and a truck immediately prior to collision.

FIG. 9 shows a truck with the collision protection (bumper) deployed, as well as the car, also with the collision protection deployed, immediately prior to collision. The overlap between the vehicles is 40%, which is the mean value derived from a number of studies of frontal collisions in right-hand traffic.

What is claimed is:

1. A collision safety device for a vehicle having a bumper, comprising:
    a pivot bolt pivotally securing said bumper at one end thereof to said vehicle,
    a propellant charge (13),
    a strut having a first end and a second end wherein said second end is pivotally secured to said vehicle,
    said bumper comprising an elongated channel opening along a length thereof, wherein said strut is slidably connected to said bumper at said first end by a bolt through said elongated channel opening,
    an electric igniter (14) operably connected to said propellant charge,
    a sensor providing a current impulse to said electrical igniter through a computing device, wherein said sensor records the speed of said vehicle and its distance from an obstacle,
    a sleeve actuatable by said propellant charge and operably connected to a latch, wherein
        if the speed of said vehicle as determined by said sensor relative to said obstacle exceeds a predetermined value, said sensor triggers said electrical igniter and said propellant charge through said computing device whereupon said propellant charge actuates said sleeve to release said latch and said bumper pivots about said pivot bolt by said strut pivoting about said second end and said first end bolt moving along said channel.

2. Device as per patent claim 1, characterised in that the sensor (2) is interlinked with the vehicle speedometer through the computing device (30) so that the computing device can compute the braking distance at different speeds, enabling a driver to be provided with a warning of the distance from the obstacle or warned if the distance from another vehicle in front is approaching the stopping distance and wherein the computing device will automatically reduce the speed to a predetermined value if said driver fails to reduce the speed.

3. Device as per patent claim 2, characterised in that the warning system is integrated with a seat belt warning system so that a warning signal is received if the seat belts are not fastened when the vehicle reaches a predetermined speed.

4. Device as per patent claim 1, characterised in that the signal for triggering the electrical igniter further operates the braking system so that the brakes are applied before the collision safety device is deployed.

5. Device as per patent claim 1, wherein said vehicle further comprises a radiator grille (27) mounted on the bumper (1) and wherein said radiator grille is carried with the bumper (1) when it is deployed.

6. Device as per patent claim 1, characterised in that an air cushion (28) is seated in the channel opening in the bumper (1) and is inflated by said computing device in front of the radiator grille (27) mounted on the bumper (1) at an instant related to the collision speed.

7. A collision safety device for a vehicle having a bumper and a compressed air system, comprising:
    a pivot bolt pivotally securing said bumper at one end thereof to said vehicle,
    a pneumatic cylinder having a piston rod and secured to said vehicle,
    a valve operably connected to said pneumatic cylinder at an outlet end and to said compressed air system at an intake end, wherein an electric signal from the vehicle speedometer controls said valve,
    a strut having a first end and a second end wherein said second end is pivotally secured to said vehicle, said piston rod is pivotally connected to said strut,
    said bumper comprising an elongated channel opening along a length thereof, wherein said strut is slidably connected to said bumper at said first end by a bolt through said elongated channel opening, wherein
        if the speed of said vehicle relative to an obstacle exceeds a predetermined value, said electrical signal actuates said valve whereupon said valve operates said piston rod of said pneumatic cylinder to pivot said bumper out about said pivot bolt.

* * * * *